United States Patent
Hosokawa et al.

(10) Patent No.: US 9,698,557 B2
(45) Date of Patent: Jul. 4, 2017

(54) OPTICAL FIBER FOR AMPLIFICATION AND OPTICAL FIBER AMPLIFIER USING THE SAME

(71) Applicants: FUJIKURA LTD., Tokyo (JP); NIPPON TELEGRAPH AND TELEPHONE CORPORATION, Tokyo (JP); OSAKA PREFECTURE UNIVERSITY PUBLIC CORPORATION, Sakai-shi, Osaka (JP)

(72) Inventors: Tsukasa Hosokawa, Sakura (JP); Kentaro Ichii, Sakura (JP); Katsuhiro Takenaga, Sakura (JP); Shoichiro Matsuo, Sakura (JP); Hirotaka Ono, Atsugi (JP); Makoto Yamada, Sakai (JP)

(73) Assignees: FUJIKURA LTD., Tokyo (JP); NIPPON TELEGRAPH AND TELEPHONE CORPORATION, Tokyo (JP); OSAKA PREFECTURE UNIVERSITY PUBLIC CORPORATION, Sakai-Shi, Osaka (JP)

( * ) Notice: Subject to any disclaimer, the term of this patent is extended or adjusted under 35 U.S.C. 154(b) by 0 days.

(21) Appl. No.: 15/062,681

(22) Filed: Mar. 7, 2016

(65) Prior Publication Data
US 2016/0268757 A1    Sep. 15, 2016

(30) Foreign Application Priority Data

Mar. 9, 2015   (JP) .................. 2015-046331
Aug. 18, 2015  (JP) .................. 2015-161365

(51) Int. Cl.
*H01S 3/067* (2006.01)
*G02B 6/036* (2006.01)
(Continued)

(52) U.S. Cl.
CPC ...... *H01S 3/06729* (2013.01); *H01S 3/06766* (2013.01); *H01S 3/094069* (2013.01);
(Continued)

(58) Field of Classification Search
CPC ............ H01S 3/06729; H01S 3/06766; H01S 3/094069; H01S 3/0804; H01S 3/094003; G02B 6/03611
See application file for complete search history.

(56) References Cited

U.S. PATENT DOCUMENTS

| | | | | |
|---|---|---|---|---|
| 2007/0140634 A1* | 6/2007 | Windeler | ............... | G02B 6/02 385/123 |
| 2011/0064095 A1* | 3/2011 | Gapontsev | ......... | G02B 6/03611 372/6 |

(Continued)

FOREIGN PATENT DOCUMENTS

| | | |
|---|---|---|
| JP | 03-127032 A | 5/1991 |
| JP | 10-242556 A | 9/1998 |

(Continued)

OTHER PUBLICATIONS

Renner, "Cutoff frequencies in optical fibres with central refractive-index depression", Optical and Quantum Electronics vol. 29, pp. 591-604 (1991).*

(Continued)

*Primary Examiner* — Eric Bolda
(74) *Attorney, Agent, or Firm* — Westerman, Hattori, Daniels & Adrian, LLP

(57) ABSTRACT

An optical fiber for amplification includes a core having an inner core and an outer core surrounding the outer circum-
(Continued)

ferential surface of the inner core. The relative refractive index difference of the inner core to a cladding is smaller than the relative refractive index difference of the outer core to the cladding. The outer core is entirely doped with erbium. The theoretical cutoff wavelength of an $LP_{11}$ mode light beam is a wavelength of 1,565 nm or more. The theoretical cutoff wavelength of an $LP_{21}$ mode light beam is a wavelength of 1,530 nm or less. The theoretical cutoff wavelength of the $LP_{02}$ mode light beam is a wavelength of 980 nm or less.

16 Claims, 8 Drawing Sheets

(51) Int. Cl.
*H01S 3/094* (2006.01)
*H01S 3/16* (2006.01)
*H01S 3/08* (2006.01)
*H01S 3/0941* (2006.01)

(52) U.S. Cl.
CPC ......... *G02B 6/03611* (2013.01); *H01S 3/0804* (2013.01); *H01S 3/09415* (2013.01); *H01S 3/094003* (2013.01); *H01S 3/1608* (2013.01)

(56) References Cited

U.S. PATENT DOCUMENTS

| | | | |
|---|---|---|---|
| 2011/0064097 A1 | 3/2011 | Gapontsev et al. | |
| 2011/0149383 A1 | 6/2011 | Kashiwagi et al. | |
| 2011/0228382 A1 | 9/2011 | Mattsson et al. | |
| 2011/0235166 A1* | 9/2011 | Zhu ...................... | G02B 6/0288 359/341.3 |
| 2013/0230290 A1* | 9/2013 | Evans .................. | G02B 6/0288 385/124 |
| 2014/0036348 A1* | 2/2014 | Bennett ............... | H01S 3/06754 359/341.3 |
| 2015/0098697 A1* | 4/2015 | Marom .................. | H04J 14/04 398/44 |
| 2015/0318661 A1* | 11/2015 | Matsuo .............. | G02B 6/02042 359/341.3 |
| 2016/0043525 A1 | 2/2016 | Ichige et al. | |

FOREIGN PATENT DOCUMENTS

| | | |
|---|---|---|
| JP | 2013-513243 A | 4/2013 |
| JP | 2014-179404 A | 9/2014 |
| WO | 2011/077984 A1 | 6/2011 |

OTHER PUBLICATIONS

Jung, Y. et al, "Few-mode EDFA Supporting 5 Spatial Modes with Reconfigurable Differential Modal Gain Control", 39th European conference and exhibition on optical communication (ECOC 2013), 2013, pp. 582-584.

Office Action dated Jul. 5, 2016, issued in counterpart Japanese Application 2015-161365. (3 pages).

Yung et al., "First demonstration of multimode amplifier for spatial division multiplexed transmission systems," Proc. ECOC, 2011, Th.13.K4, (3 pages).

Le Cocq et al., "Modeling and characterization of a few-mode EDFA supporting four mode groups for mode division multiplexing," Opt. Express 20, 2012, pp. 27051-27061.

Hosokawa et al., "Two-Mode EDF with Ring-Type Refractive Index Profile", The Institute of Electronics, Information and Communication Engineers Society Conference 2014 preliminary draft No. B-10-12, Sep. 9, 2014, (3 pages).

Hosokawa et al., "Two-Mode EDF with Ring-Type Refractive Index Profile", The Institute of Electronics, Information and Communication Engineers Society Conference 2014, Sep. 25, 2014, (12 pages).

Hosokawa et al., "Two-Mode EDF with Ring-Type Refractive Index Profile", The Institute of Electronics, Information and Communication Engineers, Technical Committee on Optical Communication Systems, The 28th symposium on optical communication systems preliminary draft p. 26, Dec. 11, 2014, (2 pages).

Hosokawa et al., "Two-Mode EDF with Ring-Type Refractive Index Profile", The Institute of Electronics, Information and Communication Engineers, Technical Committee on Optical Communication Systems, The 28th symposium on optical communication systems, Dec. 11, 2014, (1 pages).

Hosokawa et al., "Improvement of differential modal gain in few-mode fibre amplifier by employing ring-core erbium-doped fibre", Electronics Letters vol. 51 No. 2 pp. 172-173, Jan. 22, 2015, (2 pages).

Hosokawa et al., "Suppression of Differential Modal Gain by Two-Mode EDF with Ring-Type Index Profile", The Institute of Electronics, Information and Communication Engineers IEICE technical report vol. 114 No. 451 pp. 71-75, Feb. 12, 2015, (5 pages).

Hosokawa et al., "Suppression of Differential Modal Gain by Two-Mode EDF with Ring-Type Index Profile", The Institute of Electronics, Information and Communication Engineers Society February Symposium, Feb. 20, 2015, (21 pages).

* cited by examiner

OPTICAL FIBER FOR AMPLIFICATION AND OPTICAL FIBER AMPLIFIER USING THE SAME

BACKGROUND OF THE INVENTION

The present invention relates to an optical fiber for amplification and an optical fiber amplifier using the same for use in optical communications, which are suitable for the case of reducing the difference in gains between an $LP_{01}$ mode light beam and an $LP_{11}$ mode light beam.

In optical communications, signals are superposed on light beams propagating through an optical fiber for communications. In order to increase information volumes transmitted through a single core in such optical communications, there are known few-mode communications in which information is superposed on an $LP_{01}$ mode (a fundamental mode) light beam and on an $LP_{11}$ mode light beam of signal light beams for information communications. Therefore, in the case of amplifying signal light beams propagating through an optical fiber using an optical fiber amplifier, it is necessary to amplify both of the $LP_{01}$ mode and $LP_{02}$ mode light beams.

Non Patent Literature 1 below describes an optical fiber for amplification in which the core of the optical fiber for amplification has a step refractive index, i.e., the refractive index of the core is constant in the radial direction. The core is doped with erbium. The concentration of erbium is constant in the core. However, in the case of amplifying light beams using such an optical fiber for amplification, the gain of the $LP_{01}$ mode light beam is often different from the gain of the $LP_{11}$ mode light beam.

Therefore, Non Patent Literature 2 below describes an optical fiber for amplification aiming for reducing such gain differences. The optical fiber for amplification described in Non Patent Literature 2 has the refractive index profile of the core similar to the refractive index profile of the core of the optical fiber for amplification described in Non Patent Literature 1. However, in the optical fiber for amplification in Non Patent Literature 2, erbium is not doped in the center region including the center axis of the core, and erbium is doped in the outer region surrounding the center region. Consequently, the power of the $LP_{01}$ mode light beam and the power of the $LP_{11}$ mode light beam propagating through the region doped with erbium are adjusted, and thus the gain of the $LP_{01}$ mode light beam is made equal to the gain of the $LP_{11}$ mode light beam.

[Non Patent Literature 1] Y. Yung et al., " First demonstration of multimode amplifier for spatial division multiplexed transmission systems," Proc. ECOC '11, Th.13.K4 (2011)

[Non Patent Literature 2] G. Le Cocq et al., "Modeling and characterization of few-mode EDFA supporting four mode groups for mode division multiplexing," Opt. Express 20, 27051-27061 (2012)

SUMMARY OF THE INVENTION

However, even in the optical fiber for amplification described in Non Patent Literature 2, the gain of the $LP_{01}$ mode light beam is sometimes varied from the gain of the $LP_{11}$ mode light beam. This difference in gains between the $LP_{01}$ mode and $LP_{11}$ mode light beams is resulted from the fact that the pumping value of erbium is inconstant in the region doped with erbium. Pumping light to pump erbium propagates through the core of the optical fiber for amplification as multi-mode light beams. Thus, in the region doped with erbium in the core, the power of pumping light is unevenly distributed. Consequently, in the region doped with erbium, the population inversion of erbium is inconstant. As described above, pumped erbium is unevenly distributed, causing a change in the gains of the $LP_{01}$ mode and $LP_{11}$ mode light beams even though the power of the $LP_{01}$ mode light beam and the power of the $LP_{11}$ mode light beam are the same in signal light beams propagating through the region doped with erbium.

Consequently, it is important to adjust the power of a light beam in each mode in pumping light propagating through the optical fiber for amplification, i.e., to adjust the excitation ratio of each mode in pumping light. However, since a complicated optical system is necessary to adjust the excitation ratio, a more complicated optical system is necessary as the number of modes is more increased. This creates demands that the number of modes of pumping light is decreased and the difference in gains between the $LP_{01}$ mode and $LP_{11}$ mode light beams in signal light beams is easily reduced.

Therefore, it is an object of the present invention is to provide an optical fiber for amplification and an optical fiber amplifier using the same that can easily reduce the difference in gains between the $LP_{01}$ mode and $LP_{11}$ mode light beams.

In order to solve the problem, an aspect of the present invention is an optical fiber for amplification including a core having an inner core and an outer core surrounding an outer circumferential surface of the inner core. The following is its features.

In other words, a relative refractive index difference of the inner core to a cladding is smaller than a relative refractive index difference of the outer core to the cladding. The outer core is entirely doped with erbium. A theoretical cutoff wavelength of an $LP_{11}$ mode light beam is a wavelength of 1,565 nm or more. A theoretical cutoff wavelength of an $LP_{21}$ mode light beam is a wavelength of 1,530 nm or less. A theoretical cutoff wavelength of an $LP_{02}$ mode light beam is a wavelength of 980 nm or less.

According to the optical fiber for amplification of the embodiment of the present invention, in a waveband of 1,530 to 1,565 nm, i.e., in the C-band, the $LP_{01}$ mode and $LP_{11}$ mode light beams can be amplified. Accordingly, the optical fiber for amplification can be used for a few-mode communication optical fiber amplifier for signal light beams in the C-band.

The relative refractive index difference of the inner core to the cladding is smaller than the relative refractive index difference of the outer core to the cladding. Thus, the power of the $LP_{01}$ mode light beam can be unevenly distributed near to the outer core. Moreover, the outer core is doped with erbium. Consequently, in the case in which signal light beams propagate through the core, the difference in power between the $LP_{01}$ mode and $LP_{11}$ mode light beams propagating through the region of the core doped with erbium can be decreased. The theoretical cutoff wavelength of the $LP_{02}$ mode light beam is a wavelength of 980 nm or less. Thus, in the case in which pumping light to pump erbium propagates through the core, the modes of the pumping light can be limited to the $LP_{01}$ mode, the $LP_{11}$ mode, the $LP_{21}$ mode, and an $LP_{31}$ mode. In Non Patent Literature 2 above, there are six modes for pumping light. Compared with this, the number of the modes of pumping light can be decreased. Consequently, the excitation ratio of light beams in these four modes only has to be controlled so that the gain of the $LP_{01}$ mode light beam is equal to the gain of the $LP_{11}$ mode light beam in signal light beams. Therefore, according to the optical fiber for amplification of the embodiment of the present invention, the difference in gains between the $LP_{01}$ mode and $LP_{11}$ mode light beams can be easily reduced.

Further, a ratio $D_1/D_2$ is preferably 0.5 or greater, where a diameter of the inner core is defined as $D_1$, and an outer diameter of the outer core is defined as $D_2$, and a ratio $\Delta_{nci}/\Delta_{nco}$ is preferably 0.1 or less, where the relative refractive index difference of the inner core to the cladding is defined as $\Delta_{nci}$, the relative refractive index difference of the outer core to the cladding is defined as $\Delta_{nco}$.

The core is thus configured. Consequently, in a predetermined range of the cutoff wavelength of the $LP_{21}$ mode light beam, the power can be almost made equal between the $LP_{01}$ mode and $LP_{11}$ mode light beams propagating through the outer core. Moreover, the theoretical cutoff wavelength of the $LP_{02}$ mode light beam can be more appropriately a wavelength of 980 mn or less. From the definition of the inner core and the outer core, the ratio $D_1/D_2$ is obviously smaller than one.

In this case, more preferably, the ratio $D_1/D_2$ is 0.6 or greater.

The ratio $D_1/D_2$ is set to 0.6 or greater. Thus, the difference in power between the $LP_{01}$ mode and $LP_{11}$ mode light beams propagating through the outer core can be almost zero.

In this case, preferably, the ratio $D_1/D_2$ is 0.8 or less.

In a region in which the ratio $D_1/D_2$ is greater than 0.8, the difference between the sum total of the power of light in the $LP_{01}$ mode signal light beam propagating through the outer core and the sum total of the power of light in the $LP_{11}$ mode signal light beam propagating through the outer core is not greatly changed, compared with the difference in a region in which the ratio $D_1/D_2$ is 0.8 or less. On the other hand, under the condition that the ratio $D_1/D_2$ is 0.8 or less, decreases in the gains of the $LP_{01}$ mode and $LP_{11}$ mode light beams in signal light beams can be reduced.

In this case, preferably, the ratio $\Delta_{nci}/\Delta_{nco}$ is zero or greater.

Preferably, the theoretical cutoff wavelength of the $LP_{21}$ mode light beam is a wavelength of 1,430 nm or more. More preferably, the cutoff wavelength is a wavelength of 1,450 nm or more.

An optical fiber amplifier according to an aspect of the present invention includes the optical fiber for amplification described above, and a pumping light source configured to emit a pumping light beam in a 980 nm wavelength band, the pumping light beam being entered into the core.

This optical fiber amplifier can reduce the difference in gains between the $LP_{01}$ mode and $LP_{11}$ mode light beams in the C-band. Therefore, the optical fiber amplifier more appropriately allows few-mode communications in the C-band.

As described above, according to an aspect of the present invention, there are provided an optical fiber for amplification and an optical fiber amplifier using the same that can easily reduce the difference in gains between the $LP_{01}$ mode and $LP_{11}$ mode light beams.

DETAILED DESCRIPTION OF THE INVENTION

In the following, a preferred embodiment of an optical fiber for amplification according to an embodiment of the present invention and an optical fiber amplifier using the same will be described in detail with reference to the drawings. For easy understanding, the scales of the drawings are sometimes different from the scales in the following description.

<Description of Amplification Optical Fiber>

Figure 1:
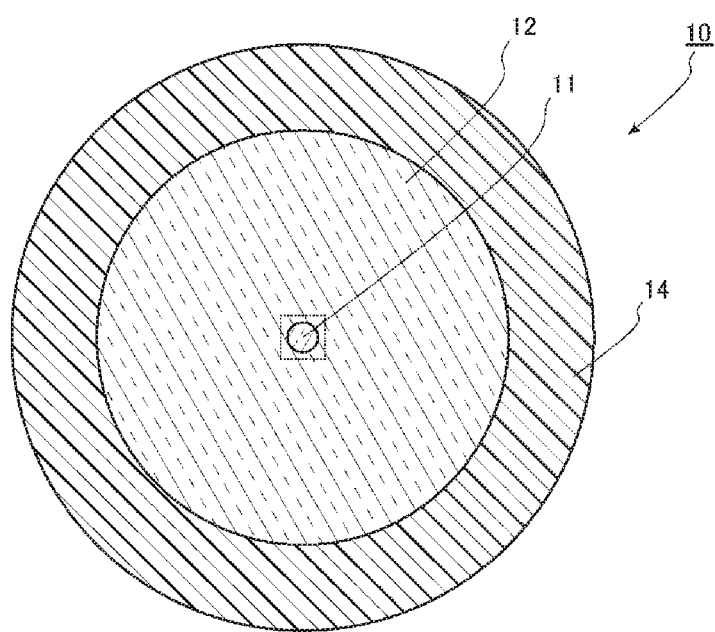
FIG. 1 is a diagram of a cross section perpendicular to the longitudinal direction of an optical fiber for amplification according to an embodiment of the present invention.

FIG. 1 is a diagram of a cross section perpendicular to the longitudinal direction of an optical fiber for amplification according to an embodiment of the present invention. As illustrated in FIG. 1, an optical fiber for amplification 10 includes a core 11, a cladding 12 surrounding the outer circumferential surface of the core 11 with no gap, and a buffer layer 14 covering the cladding 12 as main components. The diameter of the core 11 is 10 μm, for example. The outer diameter of the cladding 12 is 125 μm, for example.

The optical fiber for amplification 10 according to the embodiment is a few-mode fiber through which an $LP_{01}$ mode light beam and an $LP_{02}$ mode light beam in the C-band are transmitted. In other words, in the optical fiber for amplification 10, the theoretical cutoff wavelength of the $LP_{11}$ mode light beam is a wavelength of 1,565 nm or more, and the theoretical cutoff wavelength of an $LP_{21}$ mode light beam is a wavelength of 1,530 nm or less.

Figure 2A:
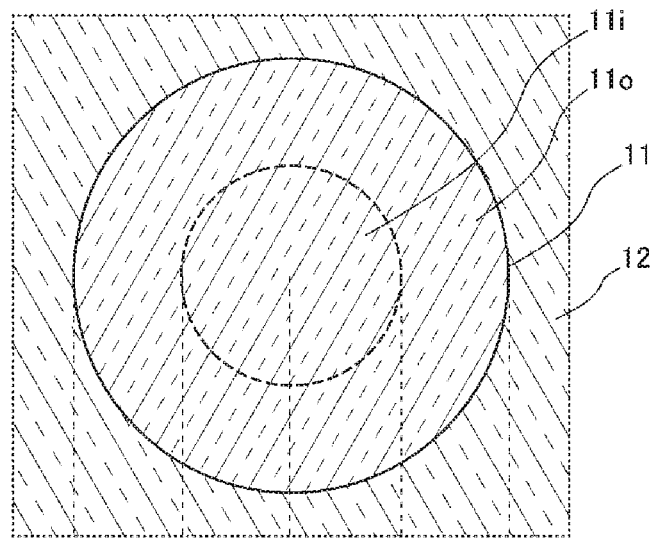
FIG. 2A is a diagram of a core and a cladding in a region indicated by dotted lines in FIG. 1.
Figure 2B:
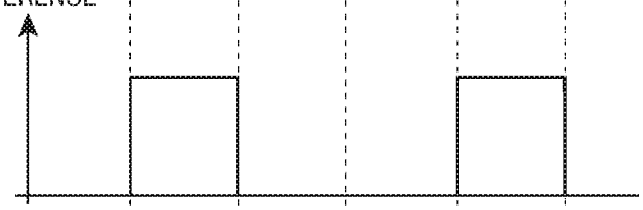
FIG. 2B is a diagram of a refractive index profile in the region in FIG. 2A.
Figure 2C:
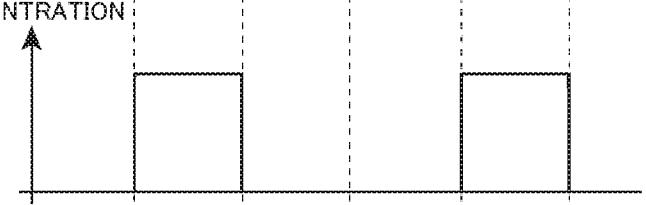
FIG. 2C is a diagram of the concentration distribution of erbium doped in the core.
Figure 2D:
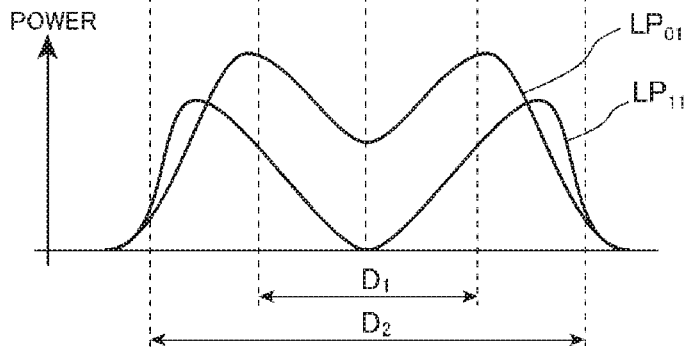
FIG. 2D is a diagram of the power distribution of an $LP_{01}$ mode light beam and an $LP_{02}$ mode light beam propagating through the core.

FIGS. 2A to 2D are diagrams of the core 11 of the optical fiber for amplification 10 in FIG. 1 and regions around the core 11. More specifically, FIG. 2A is a diagram of the core 11 and the cladding 12 in the region indicated by dotted lines in FIG. 1. FIG. 2B is a diagram of the refractive index profile in the regions in FIG. 2A. FIG. 2C is a diagram of the concentration distribution of erbium doped in the core 11. FIG. 2D is a diagram of the power distribution of the $LP_{01}$ mode and $LP_{02}$ mode light beams propagating through the core 11.

As illustrated in FIG. 2A, the core 11 is formed of an inner core 11i including the center axis and an outer core 11o surrounding the outer circumferential surface of the inner core 11i with no gap.

As illustrated in FIG. 2B, the refractive index of the inner core 11i is lower than the refractive index of the outer core 11o. In the embodiment, the refractive index of the inner core 11i is equal to the refractive index of the cladding 12. The relative refractive index difference of the outer core 11o to the cladding 12 is 1%, for example. Since such a refractive index profile is provided, for example, the outer core 11o is made of silica doped with a dopant such as germanium (Ge) to increase the refractive index. The inner core 11i and the cladding 12 are formed of silica doped with no dopant. In the case in which the outer core 11o is made of silica doped with no dopant, the inner core 11i and the cladding 12 are made of silica doped with a dopant such as fluorine to decrease the refractive index.

As illustrated in FIG. 2C, the outer core 11o is doped with erbium. In the embodiment, the outer core 11o is entirely doped with erbium, whereas the inner core 11i is doped with no erbium.

The optical fiber for amplification 10 transmits light beams in few modes, the $LP_{01}$ mode and the $LP_{11}$ mode, in the C-band. In the case in which the refractive index of the core 11 is constant in the radial direction, the peak of the power of the $LP_{01}$ mode light beam is originally located in the center of the core. However, since the core 11 of the optical fiber for amplification 10 according to the embodiment has the refractive index profile as illustrated in FIG. 2B, light beams propagating through the core are displaced to the outer circumferential side. Consequently, as illustrated in FIG. 2D, the $LP_{01}$ mode light beam is also displaced to the outer circumferential side, and the peak of the power of the $LP_{01}$ mode light beam is located as displaced from the center to the outer circumferential side. The $LP_{11}$ mode light beam is also displaced to the outer circumferential side. In the embodiment, in light beams in the C-band propagating through the core 11, the sum total of the power of light in the $LP_{01}$ mode light beam propagating through the outer core 11o is made almost equal to the sum total of the power of light in the $LP_{11}$ mode light beam propagating through the outer core 11o.

Next, a configuration will be described in which the sum total of the power of the $LP_{01}$ mode light beam is almost equal to the sum total of the power of the $LP_{11}$ mode light beam in the outer core 11o.

Figure 3:
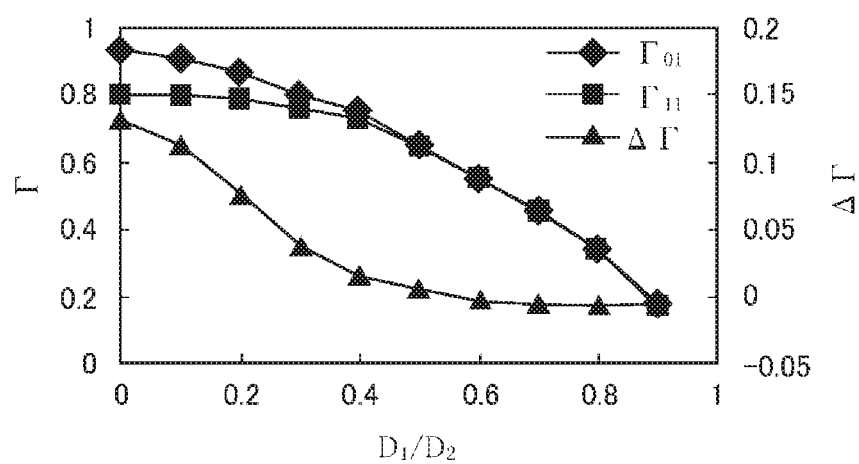
FIG. 3 is a diagram of the relationship between the ratio of the diameter of the inner core to the outer diameter of the outer core and the power of the $LP_{01}$ mode and $LP_{11}$ mode light beams propagating through the outer core.

FIG. 3 is a diagram of the relationship between a ratio of a diameter $D_1$ of the inner core 11i to an outer diameter $D_2$ of the outer core 11o (the diameter of the core 11) and the power of the $LP_{01}$ mode and $LP_{11}$ mode light beams propagating through the outer core 11o. In FIG. 3, the sum total of the power of light in the $LP_{01}$ mode light beam propagating through the outer core 11o is expressed by $\Gamma_{01}$, and the sum total of the power of light in the $LP_{11}$ mode light beam propagating through the outer core 11o is expressed by $\Gamma_{11}$. The difference between the power $\Gamma_{01}$ and the power $\Gamma_{11}$ is expressed by $\Delta\Gamma$. The vertical axis expresses the values of the power $\Gamma_{01}$, the power $\Gamma_{11}$, and the difference $\Delta\Gamma$. The horizontal axis expresses the ratio $D_1/D_2$ of the diameter $D_1$ of the inner core 11i to the outer diameter $D_2$ of the outer core 11o. In FIG. 3, the cutoff wavelength of the $LP_{21}$ mode light beam is set to a wavelength of 1,450 nm. The relative refractive index difference of the outer core 11o to the cladding 12 is set to 1%. The refractive index of the inner core 11i is equal to the refractive index of the cladding. Under these conditions, the outer diameter $D_2$ is defined. As illustrated in FIG. 3, under the condition that the ratio $D_1/D_2$ is 0.5 or greater, almost no difference is present between the values of the power $\Gamma_{01}$ and the power $\Gamma_{11}$, and the absolute value of the difference $\Delta\Gamma$ is 0.01 or less. Under the condition that the ratio $D_1/D_2$ is 0.6 or greater, the difference $\Delta\Gamma$ between the values of the power $\Gamma_{01}$ and the power $\Gamma_{11}$ is almost zero. Preferably, the upper limit of the ratio $D_1/D_2$ is 0.8 so that the gains of the $LP_{01}$ mode and $LP_{11}$ mode light beams are not too small because of too small vales of the power $\Gamma_{01}$ and the power $\Gamma_{11}$. In FIG. 3, the wavelength of light beams propagating through the core 21 is set to a wavelength of 1,550 nm. However, the tendency observed in FIG. 3 is similarly observed at other wavelengths. As described above, the cutoff wavelength of the $LP_{21}$ mode light beam is set to a wavelength of 1,450 nm. Consequently, under the condition that the cutoff wavelength of the $LP_{21}$ mode light beam is at least a wavelength of 1,450 nm, the above-described tendency is observed in the ratio $D_1/D_2$. However, as described later, even though the cutoff wavelength of the $LP_{21}$ mode light beam is changed by about 20 nm from the cutoff wavelength in FIG. 3, the tendency is not different so much from FIG. 3. Therefore, under the condition that the cutoff wavelength of the $LP_{21}$ mode light beam is a wavelength of 1,430 nm, the tendency is not different so much from FIG. 3.

Figure 4:
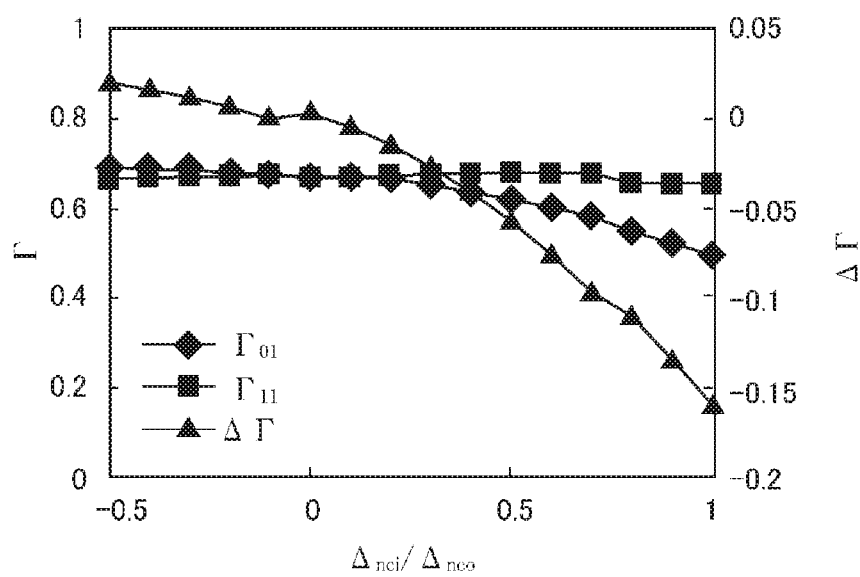
FIG. 4 is a diagram of the relationship between the ratio between the relative refractive index difference of the inner core to the cladding and the relative refractive index difference of the outer core to the cladding and the power of the $LP_{01}$ mode and $LP_{11}$ mode light beams propagating through the outer core.

Next, in the case in which the ratio $D_1/D_2$ is 0.5, a ratio $\Delta_{nci}/\Delta_{nco}$ between a relative refractive index difference $\Delta_{nci}$ of the inner core 11i to the cladding 12 and a relative refractive index difference $\Delta_{nco}$ of the outer core 11o to the cladding 12 is changed. FIG. 4 is a diagram of the relationship of the ratio $\Delta_{nci}/\Delta_{nco}$ to the power $\Gamma_{01}$ of the $LP_{01}$ mode light beam and the power $\Gamma_{11}$ of the $LP_{11}$ mode light beam propagating through the outer core 11o. As illustrated in FIG. 4, under the condition that the ratio $\Delta_{nci}/\Delta_{nco}$ is 0.1 or less, the value of the power $\Gamma_{01}$ is not different from the value of the power $\Gamma_{11}$. The conditions of the wavelength of light propagating through the core 11 in FIG. 4 are the same as the conditions of the wavelength of light propagating through the core 11 in FIG. 3. The tendency observed in FIG. 4 is almost the same at other wavelengths. The conditions of the cutoff wavelength of the $LP_{21}$ mode light beam in FIG. 4 are the same as the conditions of the cutoff wavelength of the $LP_{21}$ mode light beam in FIG. 3. Consequently, under the condition that the cutoff wavelength of the $LP_{21}$ mode light beam is at least a wavelength of 1,450 nm, the tendency of the ratio $\Delta_{nci}/\Delta_{nco}$ is observed. Even though the cutoff wavelength of the $LP_{21}$ mode light beam is changed by about 20 nm from FIG. 4, the tendency is not different so much from FIG. 4. Consequently, under the condition that the cutoff wavelength of the $LP_{21}$ mode light beam is a wavelength of 1,430 nm, the tendency is not different so much from FIG. 4.

Figure 5:
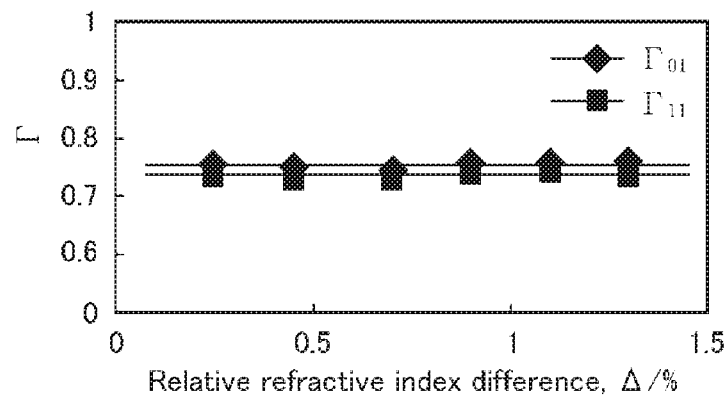
FIG. 5 is a diagram of the relationship between the relative refractive index difference of the outer core to the cladding and the power of the $LP_{01}$ mode and $LP_{11}$ mode light beams propagating through the outer core.

FIG. 5 is a diagram of the relationship between the relative refractive index difference $\Delta_{nco}$ of the outer core 11o to the cladding 12 and the power $\Gamma_{01}$ of the $LP_{01}$ mode light beam and the power $\Gamma_{11}$ of the $LP_{11}$ mode light beam propagating through the outer core 11o. In FIG. 5, the ratio $D_1/D_2$ of the diameter $D_1$ of the inner core 11i to the outer diameter $D_2$ of the outer core 11o is 0.4. The relative refractive index difference $\Delta_{nci}$ of the inner core 11i to the cladding is zero. The outer core 11o has the outer diameter $D_2$ in which the cutoff wavelength of the $LP_{21}$ mode light beam is a wavelength of 1,450 nm. Under these conditions, the horizontal axis expresses the relative refractive index difference $\Delta_{nco}$ of the outer core 11o to the cladding, and the vertical axis expresses the power $\Gamma_{01}$ of the $LP_{01}$ mode light beam and the power $\Gamma_{11}$ of the $LP_{11}$ mode light beam propagating through the outer core 11o. From FIG. 6, the difference $\Delta\Gamma$ between $\Gamma_{01}$ and $\Gamma_{11}$ is constant regardless of $\Delta_{nco}$. In other words, even in the case in which the refractive index of the outer core 11o is changed, this change gives no influence on the difference $\Delta\Gamma$.

From FIGS. 3 to 5, under the conditions that the ratio $D_1/D_2$ is 0.5 or greater and the ratio $\Delta_{nci}/\Delta_{nco}$ is 0.1 or less, the power $\Gamma_{01}$ of the $LP_{01}$ mode light beam is almost equal to the power $\Gamma_{11}$ of the $LP_{11}$ mode light beam in the outer core 11o.

Next, referring to FIGS. 6 to 10, the relationship between the differential mode gain (DMG) and the cutoff wavelength will be described.

Figure 6:
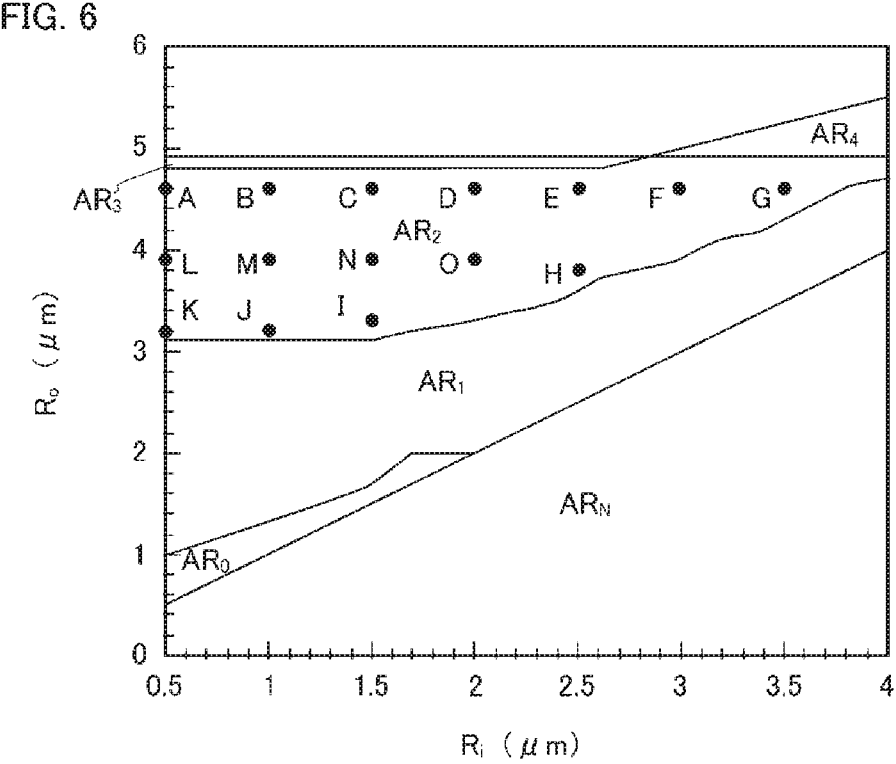
FIG. 6 is a diagram of the relationship between modes of light beams propagating at a wavelength of 1,550 nm and the radius of the inner core and the outer radius of the outer core.

FIG. 6 is a diagram of the relationship of the modes of light beams propagating at a wavelength of 1,550 nm, a radius $R_i$ of the inner core 11i, and an outer radius $R_o$ of the outer core 11o. In FIG. 6, the wavelength of light beams propagating through the core 11 was set to a wavelength of 1,550 nm. The relative refractive index difference $\Delta_{nci}$ of the inner core 11i to the cladding 12 was set to 0%. The relative refractive index difference $\Delta_{nco}$ of the outer core 11o to the cladding 12 was set to 1%. In FIG. 6, the relative refractive index differences are fixed, and the radius $R_i$ of the inner core 11i and the outer radius $R_o$ of the outer core 11o are changed as described above. Thus, in FIG. 6, the cutoff wavelength of the $LP_{21}$ mode light beam is inconstant.

In FIG. 6, in a region $AR_N$, the diameter of the inner core 11i is greater than the outer diameter of the outer core 11o. The region $AR_N$ is not physically possible. In a region $AR_0$, light beams in any modes do not propagate. In a region $AR_1$, only the $LP_{01}$ mode light beam propagates. In a region $AR_2$, only the $LP_{01}$ mode and $LP_{11}$ mode light beams propagate. In a region $AR_3$, only the $LP_{01}$ mode light beam, the $LP_{11}$ mode light beam, and the $LP_{21}$ mode light beam propagate. In a region $AR_4$, only the $LP_{01}$ mode light beam, the $LP_{11}$ mode light beam, the $LP_{21}$ mode light beam, and the $LP_{02}$ mode light beam propagate. Consequently, for the relationship between the radius $R_i$ of the inner core 11i and the outer radius $R_o$ of the outer core 11o of the optical fiber for amplification 10 according to the embodiment, the radius $R_i$ and the outer radius $R_o$ have to be included in the region $AR_2$.

Figure 7:
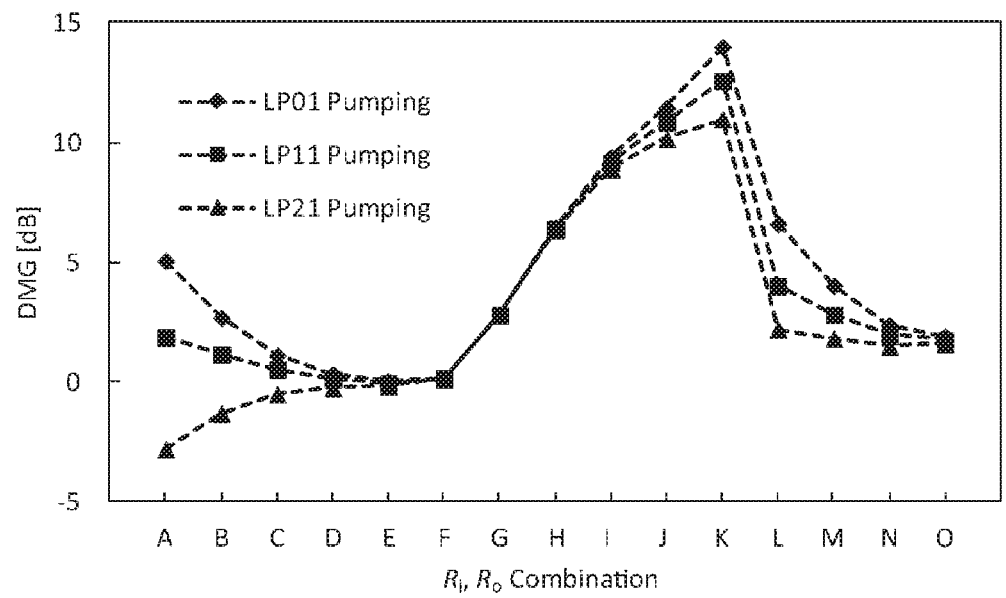
FIG. 7 is a diagram of the differential mode gains of the $LP_{01}$ mode and $LP_{11}$ mode light beams at points A to O in FIG. 6.
Figure 8:
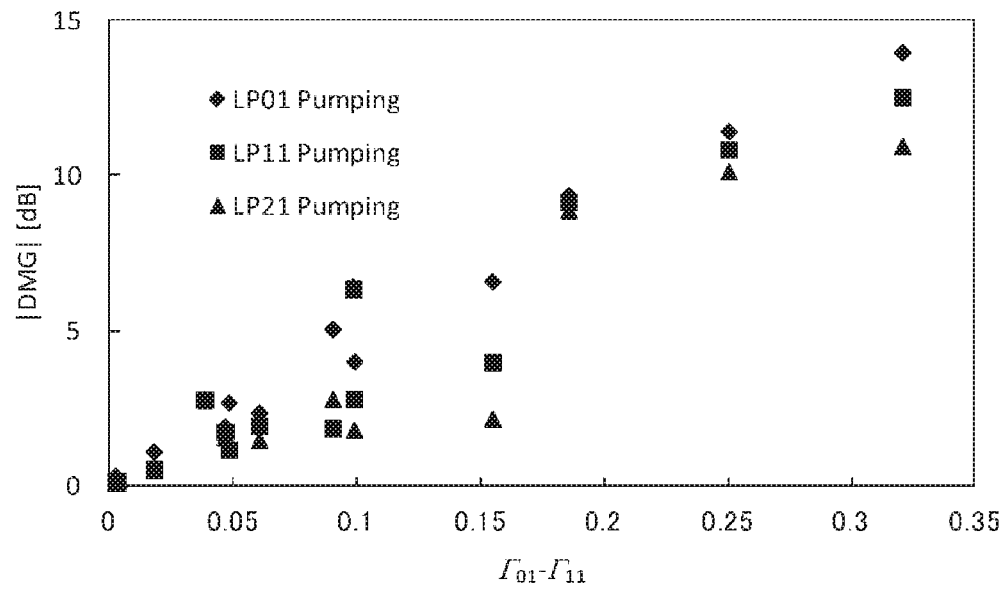
FIG. 8 is a diagram of the relationship between the difference in power between the $LP_{01}$ mode and $LP_{11}$ mode light beams propagating through the outer core and the differential mode gains of the $LP_{01}$ mode and $LP_{11}$ mode light beams.
Figure 9:
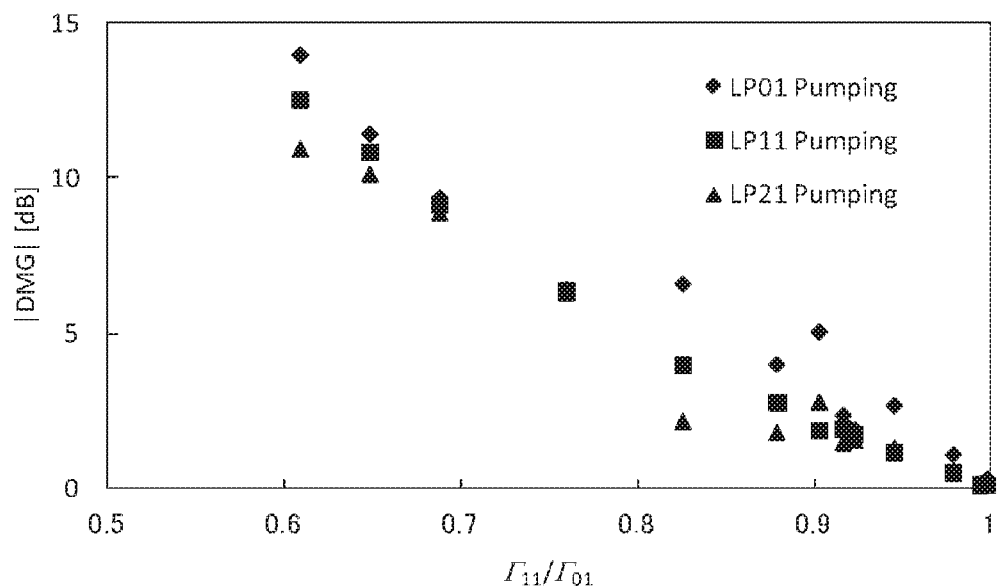
FIG. 9 is a diagram of the relationship between the ratio of the power between the $LP_{01}$ mode and $LP_{11}$ mode light beams propagating through the outer core and the differential mode gains of the $LP_{01}$ mode and $LP_{11}$ mode light beams.

Next, differential mode gains at points in the region $AR_2$ will be described. FIG. 7 is a diagram of the differential mode gains of the $LP_{01}$ mode and $LP_{11}$ mode light beams at points A to O in the region $AR_2$ in FIG. 6. FIG. 8 is a diagram of the relationship between the difference of the power $\Gamma_{01}$ of the $LP_{01}$ mode light beam to the power $\Gamma_{11}$ of the $LP_{11}$ mode light beam propagating through the outer core 11o ($\Gamma_{01}-\Gamma_{11}$) and the differential mode gains of the $LP_{01}$ mode and $LP_{11}$ mode light beams. FIG. 9 is a diagram of the relationship between the ratio of the power $\Gamma_{01}$ of the $LP_{01}$ mode light beam to the power $\Gamma_{11}$ of the $LP_{11}$ mode light beam propagating through the outer core 11o ($\Gamma_{11}/\Gamma_{01}$) and the differential mode gains of the $LP_{01}$ mode and $LP_{11}$ mode light beams. In FIGS. 7 to 9, the conditions of the wavelengths of light beams propagating through the core 11, the relative refractive index difference $\Delta_{nci}$ of the inner core 11i to the cladding 12, and the relative refractive index difference $\Delta_{nco}$ of the outer core 11o to the cladding 12 were the same as the conditions in FIG. 6. In FIGS. 7 to 9, the differential mode gain caused by pumping light in the $LP_{01}$ mode, the differential mode gain caused by pumping light in the $LP_{11}$ mode, and the differential mode gain caused by pumping light in the $LP_{21}$ mode are separately depicted.

As illustrated in FIG. 7, at points E and F, the differential mode gains are very small. At points E and F, the difference $\Gamma_{01}-\Gamma_{11}(=\Delta\Gamma)$ in FIG. 8 is plotted approximately at zero, and the ratio $\Gamma_{11}/\Gamma_{01}$ in FIG. 9 is plotted approximately at one. From FIG. 6, at points E and F, the conditions are satisfied in which the ratio $D_1/D_2$ is 0.5 or greater and the ratio $\Delta_{nci}/\Delta_{nco}$ is 0.1 or less. As described above, in FIG. 6, the relative refractive index difference $\Delta_{nci}$ is set to 0%, and the relative refractive index difference $\Delta_{nco}$ is set to 1%. From FIGS. 7 to 9, at points E and F, the difference $\Gamma_{01}-\Gamma_{11}(=\Delta\Gamma)$ is plotted approximately at zero, and the differential mode gains are very small. On the other hand, in FIG. 6, although the conditions are satisfied in which the ratio $D_1/D_2$ is 0.5 or greater and the ratio $\Delta_{nci}/\Delta_{nco}$ is 0.1 or less at some points, the differential mode gain is not small so much like point H. At such points, the cutoff wavelength of the $LP_{21}$ mode light beam is much smaller than the cutoff wavelength (1,450 nm) in FIGS. 3 and 4.

Figure 10:
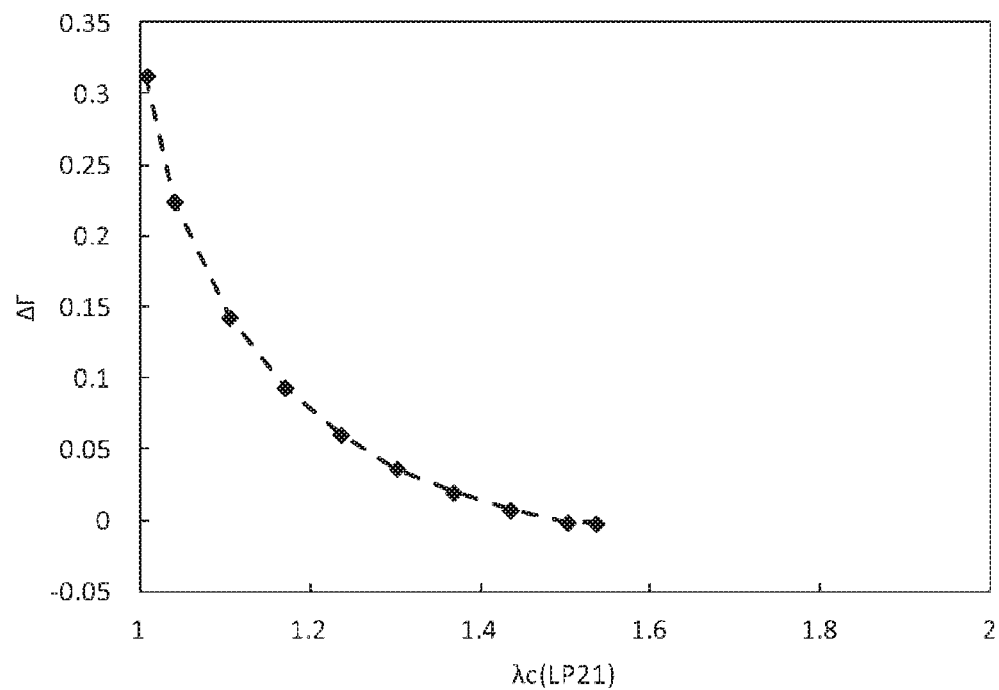
FIG. 10 is a diagram of the relationship between the difference in power between the $LP_{01}$ mode and $LP_{11}$ mode light beams and the cutoff wavelength of an $LP_{21}$ mode light beam.

FIG. 10 is a diagram of the relationship between the difference $\Delta\Gamma$ of the power $\Gamma_{01}$ of the $LP_{01}$ mode light beam to the power $\Gamma_{11}$ of the $LP_{21}$ mode light beam and a cutoff wavelength $\lambda c$ ($LP_{21}$) of the $LP_{21}$ mode light beam. In FIG. 10, the ratio $D_1/D_2$ was set to 0.5. The relative refractive index difference $\Delta_{nci}$ was set to 0%. The relative refractive index difference $\Delta_{nco}$ was set to 1%. The diameter $D_2$ was then changed from 6.2 μm to 9.4 μm, and the cutoff wavelength of the $LP_{21}$ mode light beam was changed as illustrated in FIG. 10.

As illustrated in FIG. 10, the difference $\Delta\Gamma$ is smaller as the cutoff wavelength of the $LP_{21}$ mode light beam is a longer wavelength. In other words, in FIGS. 3 and 4, the cutoff wavelength of the $LP_{21}$ mode light beam is a wavelength of 1,450 nm. However, under the condition that the cutoff wavelength is longer than a wavelength of 1,450 nm, the difference $\Delta\Gamma$ becomes much smaller. From FIG. 10, under the condition that the cutoff wavelength of the $LP_{21}$ mode light beam is a wavelength of 1,430 nm or more, the difference $\Delta\Gamma$ is 0.01 or less. Consequently, as described in FIGS. 3 and 4, under the condition that the cutoff wavelength of the $LP_{21}$ mode light beam is a wavelength of 1,430 nm, the tendency is not different so much from FIGS. 3 and 4. In other words, the conditions are satisfied in which the cutoff wavelength of the $LP_{21}$ mode light beam is a wavelength of 1,430 nm, the ratio $D_1/D_2$ is 0.5 or greater, and $\Delta_{nci}/\Delta_{nco}$ is 0.1 or less. Thus, the difference $\Delta\Gamma$ can be set to 0.01 or less.

Next, a configuration will be described in which the cutoff wavelength of the $LP_{02}$ mode light beam propagating through the core 11 is smaller than a wavelength of 980 nm.

Figure 11:
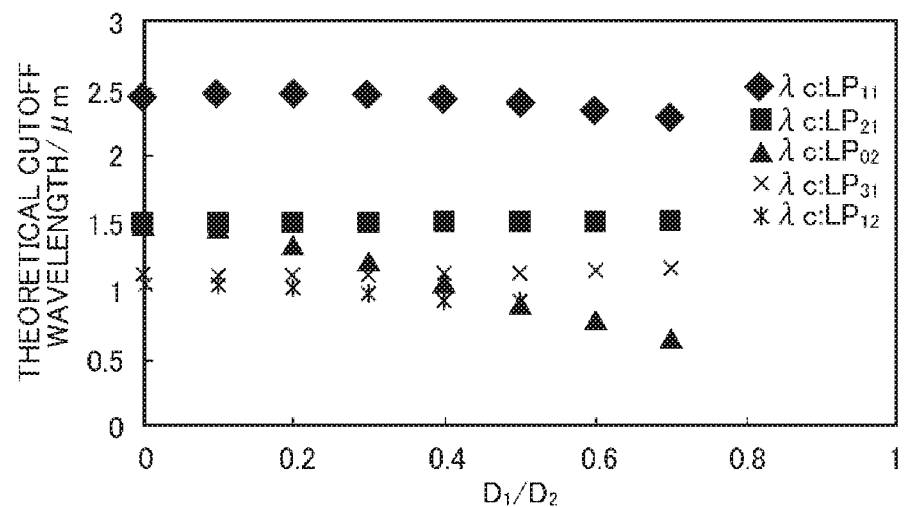
FIG. 11 is a diagram of the relationship between the ratio of the diameter of the inner core to the outer diameter of the outer core and the cutoff wavelength.

FIG. 11 is a diagram of the relationship between the ratio $D_1/D_2$ of the diameter $D_1$ of the inner core 11$i$ to the outer diameter $D_2$ of the outer core 11$o$ and the cutoff wavelength $\lambda c$. In FIG. 11, the cutoff wavelength of the $LP_{21}$ mode light beam is set to a wavelength of 1,500 nm. The relative refractive index difference of the outer core 11$o$ to the cladding 12 is set to 1%. The refractive index of the inner core 11$i$ is the same as the cladding. Under these conditions, the outer diameter $D_2$ is defined. In FIG. 11, the relationship among the $LP_{11}$ mode light beam, the $LP_{21}$ mode light beam, the $LP_{02}$ mode light beam, an $LP_{31}$ mode light beam, and the $LP_{12}$ mode light beam is illustrated. From FIG. 11, under the condition that the ratio $D_1/D_2$ is 0.5 or greater, the cutoff wavelengths of the $LP_{02}$ mode and $LP_{12}$ mode light beams are smaller than a wavelength of 980 nm. Thus, under the condition that the ratio $D_1/D_2$ is 0.5 or greater, the modes of the pumping light at a wavelength of 980 nm can be the $LP_{01}$ mode, the $LP_{11}$ mode, the $LP_{21}$ mode, and the $LP_{31}$ mode.

Figure 12:
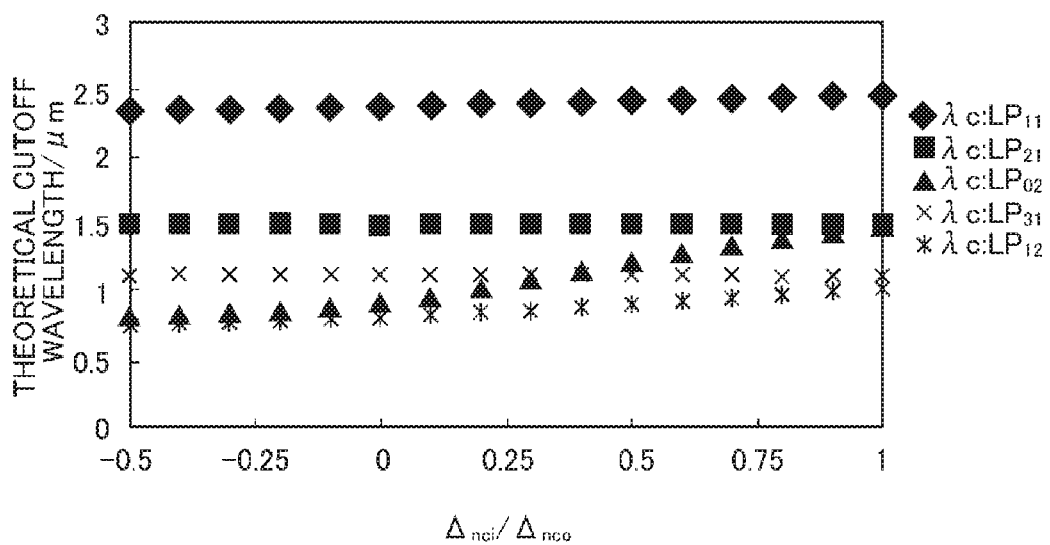
FIG. 12 is a diagram of the relationship between the ratio between the relative refractive index difference of the inner core to the cladding and the relative refractive index difference of the outer core to the cladding and the cutoff wavelength.

Next, in the case in which the ratio $D_1/D_2$ is 0.5, the ratio $\Delta_{nci}/\Delta_{nco}$ between the relative refractive index difference $\Delta_{nci}$ of the inner core 11$i$ to the cladding 12 and the relative refractive index difference $\Delta_{nco}$ of the outer core 11$o$ to the cladding 12 is changed. FIG. 12 is a diagram of the relationship between the ratio $\Delta_{nci}/\Delta_{nco}$ and the cutoff wavelength $\lambda c$. As illustrated in FIG. 12, under the condition that the ratio $\Delta_{nci}/\Delta_{nco}$ is 0.1 or less, the cutoff wavelengths of the $LP_{02}$ mode and $LP_{12}$ mode light beams are smaller than a wavelength of 980 nm. Thus, under the condition that the ratio $\Delta_{nci}/\Delta_{nco}$ is 0.1 or less, the modes of the pumping light at a wavelength of 960 nm can be the $LP_{01}$ mode, the $LP_{11}$ mode, the $LP_{21}$ mode, and the $LP_{31}$ mode.

In other words, from FIGS. 11 and 12, under the conditions that the ratio $D_1/D_2$ is 0.5 or greater and the ratio $\Delta_{nci}/\Delta_{nco}$ is 0.1 or less, the modes of the pumping light at a wavelength of 980 nm to pump erbium doped to the outer core 11$o$ can be the $LP_{01}$ mode, the $LP_{11}$ mode, the $LP_{21}$ mode, and the $LP_{31}$ mode.

As described above, in the optical fiber for amplification 10, the theoretical cutoff wavelength of the $LP_{11}$ mode light beam is a wavelength of 1,565 nm or more, and the theoretical cutoff wavelength of the $LP_{21}$ mode light beam is a wavelength of 1,530 nm or less. For example, in order to achieve the theoretical cutoff wavelengths described above under the conditions that the ratio $D_1/D_2$ is 0.5, the ratio $\Delta_{nci}/\Delta_{nco}$ is 0, and the relative refractive index difference $\Delta_{nco}$ is 1.0%, the relationship 6.2 µm≤$D_2$≤9.4 µm only has to be held.

As described above, according to the optical fiber for amplification 10 of the embodiment, the $LP_{01}$ mode and $LP_{11}$ mode light beams can be amplified in the C-band with the $LP_{01}$ mode and $LP_{11}$ mode light beams propagating through the optical fiber for amplification 10. The difference in power between the $LP_{01}$ mode and $LP_{11}$ mode light beams propagating through the outer core 11$o$ can be decreased. The outer core 11$o$ is doped with erbium. Thus, the difference in power between the $LP_{01}$ mode and $LP_{11}$ mode light beams propagating through the region doped with erbium can be decreased. Therefore, the appropriate adjustment of the population inversion of erbium can reduce the difference in gains between the $LP_{01}$ mode and $LP_{11}$ mode light beams.

In the optical fiber for amplification 10 according to the embodiment, the theoretical cutoff wavelength of the $LP_{02}$ mode light beam is a wavelength of 980 nm or less. Thus, in the case in which the pumping light to pump erbium propagates through the core, the modes of the pumping light can be limited to the $LP_{01}$ mode, the $LP_{11}$ mode, the $LP_{21}$ mode, and the $LP_{31}$ mode. Therefore, the excitation ratio of light among these four modes only has to be controlled so that the gain of the $LP_{01}$ mode light beam is equal to the gain of the $LP_{11}$ mode light beam in signal light beams. Accordingly, according to the optical fiber for amplification 10 of the embodiment, the difference in gains between the $LP_{01}$ made and $LP_{11}$ mode light beams can be easily reduced.

<Description of the Optical Fiber Amplified>

Next, an optical fiber amplifier using the optical fiber for amplification 10 will be described with reference to FIG. 13.

Figure 13:
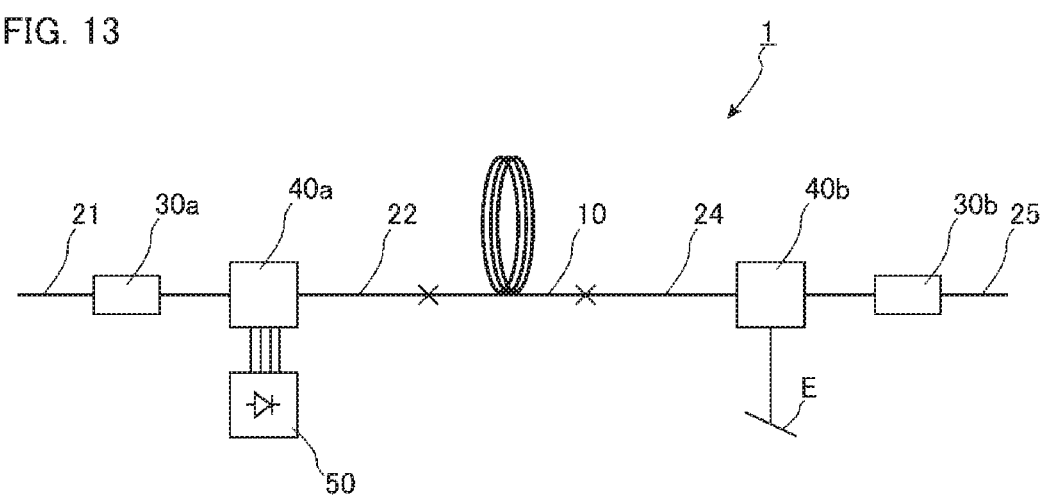
FIG. 13 is a diagram of an optical fiber amplifier according to an embodiment of the present invention.

FIG. 13 is a diagram of an optical fiber amplifier according to the embodiment. As illustrated in FIG. 13, an optical fiber amplifier 1 according to the embodiment includes, as main components, an optical fiber 21 through which signal light beams propagate for amplification, an optical isolator 30$a$ provided in the midway point of the optical fiber 21, a WDM coupler 40$a$ connected to the optical fiber 21, an optical fiber 22 having one end connected to the WDM coupler 40$a$, the optical fiber for amplification 10 having one end connected to the other end of the optical fiber 22, an optical fiber 24 having one end connected to the other end of the optical fiber for amplification 10, a WDM coupler 40$b$ connected to the other end of the optical fiber 24, an optical fiber 25 connected to the WDM coupler 40$b$, an optical isolator 30$b$ provided in the midway point of the optical fiber 25, and a pumping light source 50.

The optical fiber 21 is a few-mode fiber. The $LP_{01}$ mode and $LP_{11}$ mode light beams in the C-band, which are signal light beams, propagate through the optical fiber 21. In optical fiber 21, signals are superposed on the $LP_{01}$ mode and $LP_{11}$ mode light beams. These light beams propagate through the optical fiber 21 toward the WDM coupler 40$a$.

The optical isolator 30$a$ provided in the midway point of the optical fiber 21 transmits the signal light beams propagating from the optical fiber 21 to the WDM coupler 40$a$, and blocks the transmission of light beams propagating toward the opposite side. For example, light is unnecessarily reflected inside the optical fiber amplifier 1 and travels in the direction opposite to the traveling direction of the signal light beams. The optical isolator 30$a$ blocks the entrance of the reflected light from the optical isolator 30$a$ to the optical fiber 21.

The pumping light source 50 emits pumping light at a wavelength of 980 nm. From the pumping light emitted from the pumping light source 50, the $LP_{01}$ mode light beam, the $LP_{11}$ mode light beam, the $LP_{21}$ mode light beam, and the $LP_{31}$ mode light beam are individually emitted. For example, other than the $LP_{01}$ mode light beam, $LP_{01}$ mode light beams to be the sources of the $LP_{11}$ mode light beam, the $LP_{21}$ mode light beam, and the $LP_{31}$ mode light beam are individually emitted, and then the $LP_{11}$ mode light beam, the $LP_{21}$ mode light beam, and the $LP_{31}$ mode light beam are individually excited from these light beams. A wave phase plate only has to be used for excitation. The excited light beams in the modes are individually emitted, and then individually entered to the WDM coupler 40$a$. This is the configuration of the pumping light source 50. In order to adjust the power of each of the light beams in the modes, the power of each of the $LP_{01}$ mode light beams to be the sources of the light beams in the modes only has to be adjusted.

To the WDM coupler 40a, the signal light beams are entered from the optical fiber 21, and the pumping light beams are entered from the pumping light source 50. The WDM coupler 40a multiplexes the signal light beams with the pumping light beams, which have been entered, and enters the multiplexed light beams to the optical fiber 22. The optical fiber 22 is configured similarly to the optical fiber 21.

In the optical fiber for amplification 10 connected to the optical fiber 22, the core 11 satisfies the conditions that the ratio $D_1/D_2$ is 0.5 or greater and the ratio $\Delta_{nci}/\Delta_{nco}$ is 0.1 or less. To the optical fiber for amplification 10, the $LP_{01}$ mode and $LP_{11}$ mode light beams in the C-band propagating through the optical fiber 21 are entered, and the pumping light beams at a wavelength of 980 nm emitted from the pumping light source are entered. In the signal light beams entered to the optical fiber for amplification 10 and transmitted through the core 11, the power $\Gamma_{01}$ of the $LP_{01}$ mode light beam is almost equal to the power $\Gamma_{11}$ of the $LP_{11}$ mode light beam in the outer core 11o under the conditions satisfied on the core 11. On the other hand, the modes of the pumping light beams entered to the optical fiber for amplification 10 and transmitted through the core 11 are the $LP_{01}$ mode, the $LP_{11}$ mode, the $LP_{21}$ mode, and the $LP_{31}$ mode under the conditions satisfied on the core 11. The pumping light beams in these modes then pump erbium doped in the outer core 11o. The pumped erbium causes stimulated emission with the signal light beams for amplifying the signal light beams.

At this amplifying, as described above, the power $\Gamma_{01}$ of the $LP_{01}$ mode light beam is almost equal to the power $\Gamma_{11}$ of the $LP_{11}$ mode light beam in the outer core 11o. The excitation of the pumping light beams in these four modes is adjusted. Consequently, the $LP_{01}$ mode and $LP_{11}$ mode light beams in the signal light beams have almost the same gains. In order to achieve such gains, for example, the power of each of the pumping light beams in four modes is compared with the power of the $LP_{01}$ mode and $LP_{11}$ mode light beams in the signal light beams emitted from the optical fiber for amplification 10. The power of each of the pumping light beams in four modes is adjusted so that the gain of the $LP_{01}$ mode light beam is almost equal to the gain of the $LP_{11}$ mode light beam in the signal light beams.

The signal light beams including the $LP_{01}$ mode and $LP_{11}$ mode light beams almost equally amplified are emitted from the optical fiber for amplification 10.

The optical fiber 24 connected to the optical fiber for amplification 10 is configured similarly to the optical fiber 22. The signal light beams and the excess pumping light beams emitted from the optical fiber for amplification 10 are entered to the optical fiber 24, and transmitted through the optical fiber 24.

The signal light beams and the excess pumping light beams entered from the optical fiber 24 to the WDM coupler 40b are separated at the WDM coupler 40b. The separated excess pumping light beams are lost at a terminating device E. The signal light beams are entered to the optical fiber 25, and transmitted through the optical fiber 25.

The optical isolator 30b provided in the midway point of the optical fiber 25 transmits the signal light beams propagating from the WDM coupler 40b through the optical fiber 25, and blocks the transmission of light beams propagating toward the WDM coupler 40b. Consequently, the signal light beams are transmitted and emitted from the optical isolator 30b.

According to the optical fiber amplifier 1 of the embodiment, the optical fiber for amplification 10 reduces the difference in gains between the $LP_{01}$ mode and $LP_{11}$ mode light beams. Thus, light beams in few modes with small gain differences can be emitted.

As described so far, the embodiment is taken as an example for describing the present invention. The present invention is not limited to the embodiment.

For example, in FIG. 2, the relative refractive index difference of the inner core 11i to the cladding 12 is set to 0%. However, under the condition that the theoretical cutoff wavelength of the $LP_{02}$ mode light beam is a wavelength of 980 nm or less, the relative refractive index difference has any percentage. However, preferably, the ratio $\Delta_{nci}/\Delta_{nco}$ is 0.1 or less as described above.

As described above, according to the embodiment of the present invention, there is provided an optical fiber for amplification and an optical fiber amplifier using the same that can easily reduce the difference in gains between the $LP_{01}$ mode and $LP_{11}$ mode light beams. The optical fiber for amplification and the optical fiber amplifier are expected for use in the field of few-mode optical communications.

The invention claimed is:

1. An optical fiber for amplification comprising:
a core having an inner core and an outer core surrounding an outer circumferential surface of the inner core, wherein
a relative refractive index difference of the inner core to a cladding is smaller than a relative refractive index difference of the outer core to the cladding,
the outer core is entirely doped with erbium,
a theoretical cutoff wavelength of an $LP_{11}$ mode light beam is a wavelength of 1,565 nm or more,
a theoretical cutoff wavelength of an $LP_{21}$ mode light beam is a wavelength of 1,530 nm or less, and
a theoretical cutoff wavelength of an $LP_{02}$ mode light beam is a wavelength of 980nm or less, wherein
a ratio $D_1/D_2$ is 0.5 or greater, where a diameter of the inner core is defined as $D_1$, and an outer diameter of the outer core is defined as $D_2$, and
a ratio $\Delta_{nci}/\Delta_{nco}$ is 0.1 or less, where the relative refractive index difference of the inner core to the cladding is defined as $\Delta_{nci}$, and the relative refractive index difference of the outer core to the cladding is defined as $\Delta_{nco}$.

2. The optical fiber for amplification according to claim 1, wherein the ratio $D_1/D_2$ is 0.6 or greater.

3. The optical fiber for amplification according to claim 1, wherein the ratio $D_1/D_2$ is 0.8 or less.

4. The optical fiber for amplification according to claim 1, wherein the ratio $\Delta_{nci}/\Delta_{nco}$ is zero or greater.

5. The optical fiber for amplification according to claim 1, wherein the theoretical cutoff wavelength of the $LP_{21}$ mode light beam is a wavelength of 1,430 nm or more.

6. The optical fiber for amplification according to claim 5, wherein the theoretical cutoff wavelength of the $LP_{21}$ mode light beam is a wavelength of 1,450 nm or more.

7. The optical fiber for amplification according to claim 2, wherein the ratio $D_1/D_2$ is 0.8 or less.

8. The optical fiber for amplification according to claim 2, wherein the ratio $\Delta_{nci}/\Delta_{nco}$ is zero or greater.

9. The optical fiber for amplification according to claim 2, wherein the theoretical cutoff wavelength of the $LP_{21}$ mode light beam is a wavelength of 1,430 nm or more.

10. The optical fiber for amplification according to claim 9, wherein the theoretical cutoff wavelength of the $LP_{21}$ mode light beam is a wavelength of 1,450 nm or more.

11. The optical fiber for amplification according to claim 3, wherein the ratio $\Delta_{nci/\Delta nco}$ is zero or greater.

12. The optical fiber for amplification according to claim 3, wherein the theoretical cutoff wavelength of the $LP_{21}$ mode light beam is a wavelength of 1,430 nm or more.

13. The optical fiber for amplification according to claim 12, wherein the theoretical cutoff wavelength of the $LP_{21}$ mode light beam is a wavelength of 1,450 nm or more.

14. The optical fiber for amplification according to claim 4, wherein the theoretical cutoff wavelength of the $LP_{21}$ mode light beam is a wavelength of 1,430 nm or more.

15. The optical fiber for amplification according to claim 14, wherein the theoretical cutoff wavelength of the $LP_{21}$ mode light beam is a wavelength of 1,450 nm or more.

16. An optical fiber amplifier comprising:
   the optical fiber for amplification according to claim 1; and
   a pumping light source configured to emit a pumping light beam in a 980 nm wavelength band, the pumping light beam being entered to the core.

* * * * *